Jan. 2, 1940.  O. LANZARONE  2,185,856
JACK FOR MOTOR VEHICLES
Filed Jan. 11, 1939  2 Sheets-Sheet 1
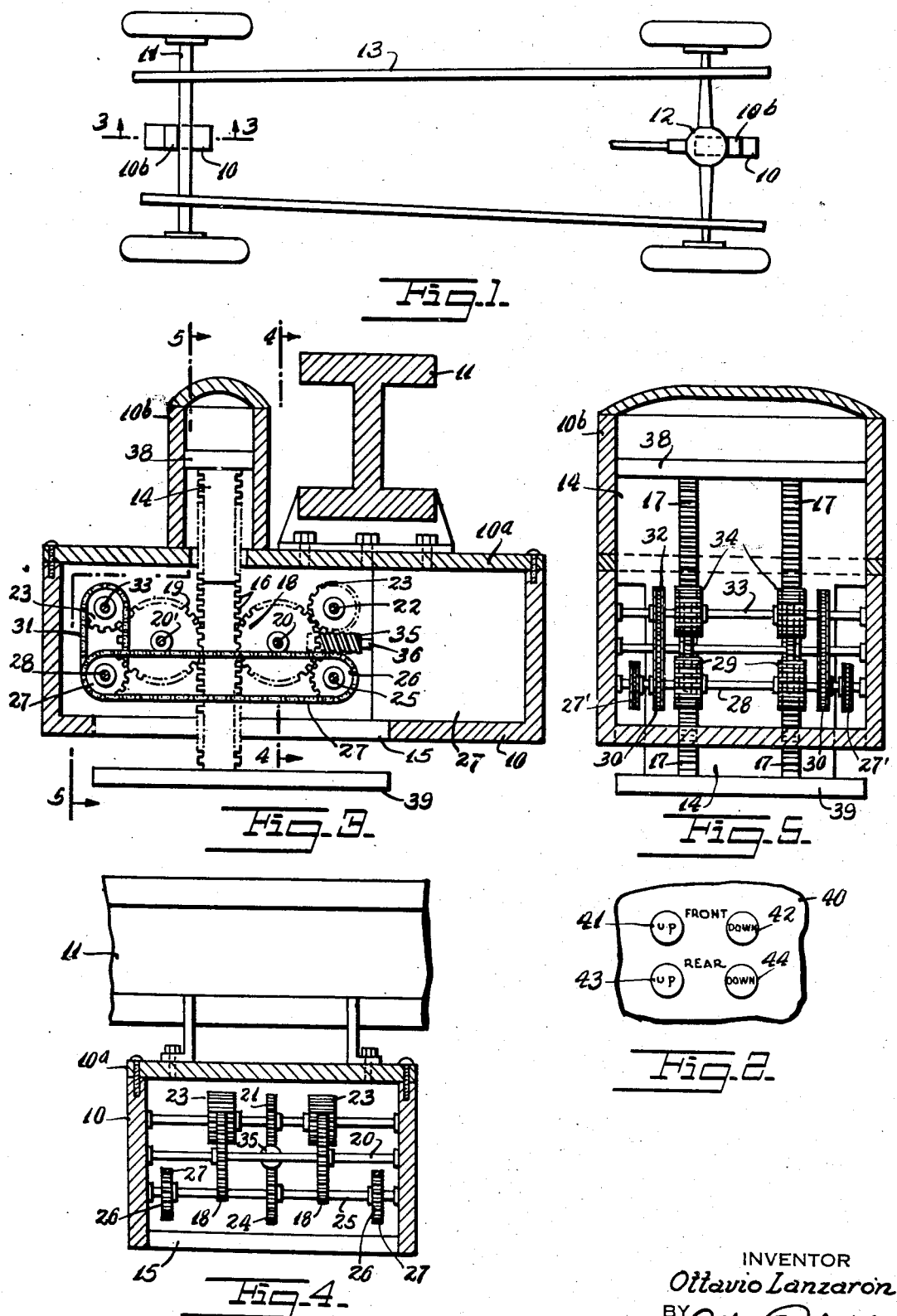
INVENTOR
Ottavio Lanzarone
BY
ATTORNEY

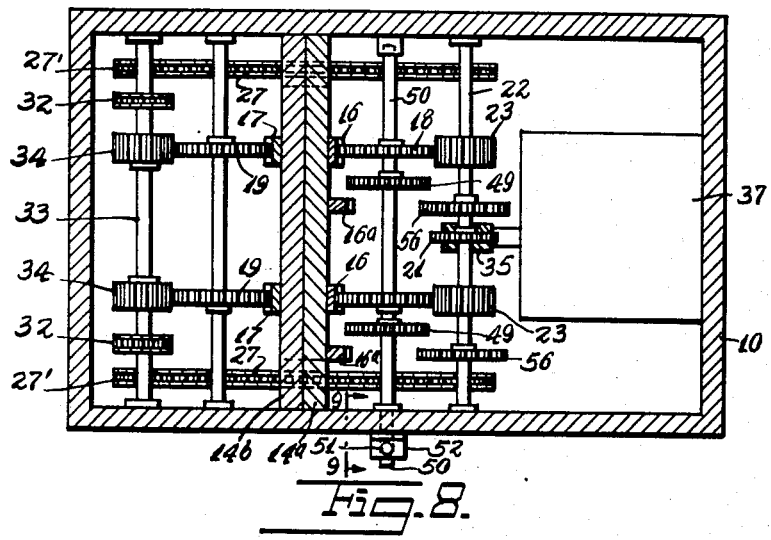

Patented Jan. 2, 1940

2,185,856

UNITED STATES PATENT OFFICE 2,185,856

JACK FOR MOTOR VEHICLES

Ottavio Lanzarone, New York, N. Y.

Application January 11, 1939, Serial No. 250,380

7 Claims. (Cl. 254—86)

This invention relates to new and useful improvements in a jack for motor vehicles.

The invention has for an object the construction of a jack which is characterized by a housing for attachment on a bottom portion of a motor vehicle, a vertical arm slidably mounted in the housing and extending from the bottom, and a novel arrangement for extending and retracting said arm.

More specifically, the invention contemplates the use of rack teeth mounted on opposite sides of said arm, the use of gears meshing with said rack teeth and two inter-connecting and dependent transmission systems for turning said gears to extend and retract the arm.

Still further the invention contemplates characterizing the transmission systems by adjacent worm wheels, and it is proposed to use an electric motor with a pinion simultaneously meshing with said worm wheels to provide the necessary power for operating the transmission systems.

Still further the invention proposes a modified arrangement of the vertical arm by which it may be arranged to engage the ground in various different ways.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a schematic plan view of a vehicle chassis with a front and rear jack constructed according to this invention mounted thereon.

Fig. 2 is a fragmentary perspective view of a portion of the dashboard of the vehicle provided with the controlling switches.

Fig. 3 is a fragmentary enlarged vertical sectional view taken on the line 3—3 of Fig. 1.

Fig. 4 is a vertical sectional view taken on the line 4—4 of Fig. 3.

Fig. 5 is a vertical sectional view taken on the line 5—5 of Fig. 3.

Fig. 6 is a schematic wiring diagram of the device.

Fig. 7 is a vertical sectional view similar to Fig. 3 but illustrating a modification of the invention.

Fig. 8 is a horizontal sectional view on the line 8—8 of Fig. 7.

Fig. 9 is a fragmentary sectional view on the line 9—9 of Fig. 8.

The jack for motor vehicles includes a housing 10 for attachment on a bottom portion of a motor vehicle, as for example on the front axle 11, or on the rear transmission housing 12. In Fig. 1 the chassis 13 of an automobile has been schematically shown with jacks, according to this invention, mounted on the front axle and upon the housing of the transmission at the rear.

A vertical arm 14 is slidably extended from the bottom of the housing 10 through an opening 15 therein. Rack teeth 16 are mounted on one of the sides of the arm 14 and other rack teeth 17 on the opposite side. Gears 18 mesh with the rack teeth 16. Other gears 19 mesh with the rack teeth 17. The gears 18 are mounted on a shaft 20 which is rotatively supported within the housing 10. The gears 19 are mounted on a shaft 20' rotative within the housing 10.

There is a transmission system for driving the gears 18. This transmission system terminates in a worm wheel 21. The transmission system includes a shaft 22 rotatively supported within the housing 10 and provided with gears 23 meshing with the gears 18. The worm wheel 21 is mounted on the shaft 22.

Another transmission system is provided for driving the gears 19 and this system terminates in a worm wheel 24. The drive system includes a shaft 25 upon which the worm wheel 24 is mounted. This shaft is rotatively supported and is provided with gears 26. Chains 27 engage over the gears 26 and extend across the housing and engage gears 27' mounted on the shaft 28. The shaft 28 is provided with gears 29 meshing with the gears 19. The shaft 28 is also provided with gears 30 engaged by vertically extending chains 31 engaging over gears 32 mounted on the shaft 33 rotative in the housing 10. Gears 34 are mounted on the shaft 33 and mesh with the gears 19.

A pinion 35 engages between the worm gears 21 and 24 and simultaneously meshes with these gears for driving both of the transmission systems. The pinion 35 is mounted on the shaft 36 of an electric motor 37 mounted within the housing 10. The housing 10 is provided with a removable cover 10ª which gives access to the interior parts. Upon the cover 10 there is a cylindrical projection 10ᵇ. The vertical arm 14 engages into this projection. A piston 38 is mounted on the top of the arm 14 and moves in the cylinder 10ᵇ and is for the purpose of steadying the vertical arm in its movement up and down. A foot 39 is mounted on the extended end of the vertical arm 14 and is adapted to engage against the ground.

An electric circuit is provided for controlling the motor 37 to rotate in one direction or the other to extend or retract the jack arm 14. The motor is controlled by switches on the dashboard of the vehicle. Fig. 2 illustrates a portion of the dashboard 40 of the vehicle. On the dashboard there is a notation "Front" indicating the front jack, and immediately below this notation there is a switch 41 imprinted with the word "Up" and a switch 42 imprinted with the word "Down." Beneath these switches there is a notation "Rear" meaning the rear jack. Beneath this notation there is a switch 43 imprinted with the word "Up" and a switch 44 imprinted with the word "Down" to control the extension and retraction of the rear jack arm.

In Fig. 6 there is a schematic wiring diagram of both the front and rear jacks. The electric motor of the front jack, indicated by reference numeral 37, is shown in an electric circuit controlled by a switch blade 45. The motor 37 is connected with a reversing switch. This reversing switch includes a switch blade 41a and a switch blade 41b comprising the blades of the switch 41 and adapted to be closed to control rotation of he motor in one direction. There are also switch blades 42a and 42b comprising the switch blades from the switch 42 controlling the rotation of the motor in the other direction. Reference numeral 37' indicates the electric motor of the rear jack. This motor is in a circuit controlled by a switch 45'. The motor 37' is connected with a reversing switch characterized by blades 43a and 43b controlling the operation of the motor in one direction and comprising the switch 43, and blades 44a and 44b controlling the operation of the motor in the other direction and comprising the switch 44.

The operation of the device is as follows:

When the switches 41 and 45 are closed the motor 37 will rotate in one direction causing the pinion 35 to turn and operating the transmission mechanisms which will operate to move the vertical arm 14 upwards. One transmission mechanism operates upon the racks 17 to move them upwards, and the other transmission mechanism operates at the same rate of speed upon the racks 17 to assist in moving the vertical arm 14 upwards. The purpose of having the racks on both sides of the vertical arm resides in the fact that there will be no unbalanced forces pushing the vertical arm laterally from one side only. The front jack may be caused to be lowered by closing the switches 42 and 45 which will cause the front motor to turn in the opposite direction, similarly, the rear jack may be caused to be extended or retracted.

In Figs. 7-9 inclusive a modified form of the invention has been disclosed which distinguishes from the prior form in the construction and arrangement of the vertical arm. According to this form of the invention there is a vertical arm 14' consisting of longitudinally adjacent sections 14a and 14b. These sections are selectively movable longitudinally relative to each other. Each of these sections is provided with a piston 38' at its upper end, working in the cylinder 10b, for assisting in steadying the sections 14a and 14b. The bottom of the arm 14' carries a foot 39' formed of separate sections 39a and 39b. The section 39a is pivotally mounted on the bottom of the section 14a of the foot 14' by means of a hinge 46. The section 39b is pivotally mounted on the bottom of the section 14b by means of a hinge 47. These sections 39a and 39b of the foot 39 have an interengaging tongue and groove 48 to extendibly connect them.

The longitudinal section 14a is provided with an auxiliary line of rack teeth 16a engageable by gears 49 mounted on the shaft 50 slidably arranged in the housing 10. The shaft 50 is normally held in an "in" position by a catch consisting of a plunger 51 slidably mounted in a bracket 52 and urged downwards by a spring 53 so that its lower end engages a groove 54 formed in the end of the shaft 50. The plunger 51 may be manually lifted and the shaft 50 drawn outwards, and then the plunger 50 re-engaged in a second groove 55 which then holds the shaft 50 extended. In this latter position the gears 49 will mesh with the racks 16a. In the former position the gears 18 mesh with the racks 16. In other respects this form of the invention is identical to the previous form.

The operation of this form of the device is as follows:

The foot 39a, 39b may be caused to assume various inclined positions, one of these positions being indicated by the dot and dash lines 39' in Fig. 7, by the manipulation of the shaft 50. When the shaft 50 is in its "out" position the gears 49 will mesh with the rack teeth 16a and with auxiliary gears 56 mounted on the shaft 22. The auxiliary gears 56 are of larger diameters than the gears 23. The gears 49 are of smaller diameter than the gears 18. When the shaft 50 is in its outermost position the gears 23 and 18 will be out of mesh with each other. Operation of the motor 37 will now cause the transmission systems to deliver different speeds of motion to the longitudinal sections 14a and 14b of the vertical arm 14'. Because of the different speeds the section 14a will be moved relative to the section 14b and this will cause pivoting of the foot 39a, 39b.

It is possible to obtain numerous inclinations of the portions of the foot 39a, 39b, inclined in one or the other direction, that is, clockwise or anticlockwise from its original position. With this arrangement it is possible to adapt the jack for any particular type of ground over which the vehicle happens to be. It is possible to cause the foot of the jack to better grip the ground, particularly, when the ground is rocky and irregular and sloping at the point where the jack is to engage the ground.

After proper relative adjustment of the foot is obtained the shaft 50 is moved to its inward position and the jack operated to raise or lower the vertical arm 14'. Now the sections 14a and 14b of the vertical arm will move as a unit upwards or downwards.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A jack for motor vehicles, comprising a housing for attachment on a bottom portion of a motor vehicle, a vertical arm slidably extending from the bottom of said housing, rack teeth on opposite sides of said arm, gears meshing with said rack teeth, a transmission system from the gears on one side of said arm to a worm wheel, another transmission system from the gears on the other side of said arm to another worm wheel for operating at the same ratio as said first-mentioned transmission system, a pinion meshing with said worm wheels, an electric motor for driving said pinion, and an electric circuit for controlling said motor to rotate in one direction or the other, said housing being provided with a cylinder at its top, and said vertical arm having a piston portion working in said cylinder.

2. A jack for motor vehicles, comprising a housing for attachment on a bottom portion of a motor vehicle, a vertical arm slidably extending from the bottom of said housing, rack teeth on opposite sides of said arm, gears meshing with said rack teeth, a transmission system from the gears on one side of said arm to a worm wheel, another transmission system from the gears on the other side of said arm to another worm wheel for operating at the same ratio as said first-mentioned transmission system, a pinion meshing with said worm wheels, an electric motor for driving said pinion, and an electric circuit for controlling said motor to rotate in one direction or the other, said first-mentioned transmission system including a shaft supporting said worm wheel, gears upon said shaft, other gears meshing with said gears and meshing with said racks.

3. A jack for motor vehicles, comprising a housing for attachment on a bottom portion of a motor vehicle, a vertical arm slidably extending from the bottom of said housing, rack teeth on opposite sides of said arm, gears meshing with said rack teeth, a transmission system from the gears on one side of said arm to a worm wheel, another transmission system from the gears on the other side of said arm to another worm wheel for operating at the same ratio as said first-mentioned transmission system, a pinion meshing witih said worm wheels, an electric motor for driving said pinion, and an electric circuit for controlling said motor to rotate in one direction or the other, said first-mentioned transmission system including a shaft supporting said worm wheel, gears upon said shaft, other gears meshing with said gears and meshing with said racks, and said second-mentioned transmission system including gears meshing with the racks adjacent the second transmission system, and several shafts with gears connected by chains and terminating in a shaft supporting the worm wheel.

4. A jack for motor vehicles, comprising a housing for attachment on a bottom portion of a motor vehicle, a vertical arm slidably extending from the bottom of said housing, rack teeth on opposite sides of said arm, gears meshing with said rack teeth, a transmission system from the gears on one side of said arm to a worm wheel, another transmission system from the gears on the other side of said arm to another worm wheel for operating at the same ratio as said first-mentioned transmission system, a pinion meshing with said worm wheels, an electric motor for driving said pinion, and an electric circuit for controlling said motor to rotate in one direction or the other, said electric motor being mounted within said housing.

5. A jack for motor vehicles, comprising a housing for attachment on a bottom portion of a motor vehicle, a vertical arm slidably extending from the bottom of said housing, rack teeth on opposite sides of said arm, gears meshing with said rack teeth, a transmission system from the gears on one side of said arm to a worm wheel, another transmission system from the gears on the other side of said arm to another worm wheel for operating at the same ratio as said first-mentioned transmission system, a pinion meshing with said worm wheels, an electric motor for driving said pinion, and an electric circuit for controlling said motor to rotate in one direction or the other, and including a pair of switches operable to cause the electric motor to rotate in one direction or the other.

6. A jack for motor vehicles, comprising a housing for attachment on a bottom portion of a motor vehicle, a vertical arm slidably extending from the bottom of said housing, rack teeth on opposite sides of said arm, gears meshing with said rack teeth, a transmission system from the gears on one side of said arm to a worm wheel, another transmission system from the gears on the other side of said arm to another worm wheel for operating at the same ratio as said first-mentioned transmission system, a pinion meshing with said worm wheels, an electric motor for driving said pinion, an electric circuit for controlling said motor to rotate in one direction or the other, said vertical arm being formed of longitudinal sections, foot sections on the lower ends of said longitudinal sections and telescopically engaging each other, and a manually operable shift for changing the ratio of said transmissions.

7. A jack for motor vehicles, comprising a housing for attachment on a bottom portion of a motor vehicle, a vertical arm slidably extending from the bottom of said housing, rack teeth on opposite sides of said arm, gears meshing with said rack teeth, a transmission system from the gears on one side of said arm to a worm wheel, another transmission system from the gears on the other side of said arm to another worm wheel for operating at the same ratio as said first-mentioned transmission system, a pinion meshing with said worm wheels, an electric motor for driving said pinion, an electric circuit for controlling said motor to rotate in one direction or the other, said vertical arm being formed of longitudinal sections, foot sections on the lower ends of said longitudinal sections and telescopically engaging each other, and a manually operable shift for changing the ratio of said transmissions, said shift including a shaft adapted to be manually moved inwards and outwards as required.

OTTAVIO LANZARONE.